United States Patent [19]

Links et al.

[11] Patent Number: 4,587,994
[45] Date of Patent: May 13, 1986

[54] SEWER DRAIN SECURING DEVICE FOR USE WITH RECREATIONAL VEHICLES

[76] Inventors: Gordon R. Links, 1616 La Playa, N.E., Albuquerque, N. Mex. 87111; Alvin L. Ellisor, 5739 Ouray Rd., N.W., Albuquerque, N. Mex. 87120

[21] Appl. No.: 775,225

[22] Filed: Sep. 12, 1985

[51] Int. Cl.⁴ .............................................. F16L 55/10
[52] U.S. Cl. ..................... 138/89; 285/119; 285/903
[58] Field of Search ............................ 4/288, 293, 295; 138/89; 141/383; 215/306; 220/322, 375, 85 F; 285/119, 305, DIG. 2, DIG. 4

[56] References Cited

U.S. PATENT DOCUMENTS

| | | | |
|---|---|---|---|
| 923,545 | 6/1909 | Madison | 138/89 X |
| 1,096,278 | 5/1914 | Sutton | 285/DIG. 2 |
| 2,373,242 | 4/1945 | Glashow | 138/89 |
| 2,772,898 | 12/1956 | Seeler | 285/305 X |
| 2,861,527 | 11/1958 | Phillips | 285/DIG. 4 |
| 3,646,980 | 3/1972 | Peterson | 138/89 X |
| 3,822,074 | 7/1974 | Welker | 285/305 |
| 4,123,035 | 10/1978 | Boudreau | 285/DIG. 2 |
| 4,133,347 | 1/1979 | Mercer | 4/321 X |
| 4,180,102 | 12/1979 | Larkin | 138/107 X |
| 4,554,949 | 11/1985 | Sell | 138/89 X |

*Primary Examiner*—Stephen Marcus
*Assistant Examiner*—Mark Thronson
*Attorney, Agent, or Firm*—Robert W. Harris

[57] ABSTRACT

A device for securing a flexible hose leading from a recreational vehicle sewage holding tank, to the inlet of a campground sewer pipe, and for closing off the inlet of the sewer pipe when not in use. A cylindrical base is permanently bonded to the top of the sewer pipe. A stopper-pin assembly, connected to the base by a light chain, has a stopper which is inserted in the base to close off the pipe inlet when the pipe is not in use, and a pin which is used to secure the flexible hose to the base, by insertion of the pin through two holes in the base so oriented as to allow the pin to pass between adjacent corrugations on the outer wall of the flexible hose.

13 Claims, 4 Drawing Figures

SEWER DRAIN SECURING DEVICE FOR USE WITH RECREATIONAL VEHICLES

BACKGROUND OF THE INVENTION

The invention pertains generally to devices for conveyance of sewage from the holding tanks of recreational vehicles into sewer pipes at campgrounds, and more particularly to the manner of connection of the flexible hose conveying the sewage from the recreational vehicle, to the sewer pipe, and the manner of maintaining closure of the sewer pipe inlet when not in use.

The common manner of draining sewage from the holding tanks of a recreational vehicle is by attaching one end of a flexible hose to the outlet of the holding tank, and connecting the other end of the flexible hose to the inlet of a campground sewer pipe. See U.S. Pat. No. 4,180,102, Larkin, col 1, lines 12–14.

In campgrounds familiar to applicants the inlet of the campground sewer pipe commonly has a diameter of approximately 3 inches, which is also the diameter of the commonly used flexible hose. The commonly used procedure is to forcibly stuff the flexible hose into the inlet of the campground sewer pipe, which is difficult because they are of approximately the same diameter, the flexible hose outer diameter being slightly oversized for the inner diameter of sewer pipe.

During drainage of the holding tank the pressure of fluid in the flexible hose causes a back pressure which often pushes the end of the flexible hose out of the sewer pipe, causing a spillage of sewage, which creates an unsanitary and quite messy condition. Efforts are often made to hold the flexible hose in the sewer pipe by the use of rope, rocks and other crude methods, but none of these methods has been found satisfactory.

In the commonly used procedure the sewer pipe is closed off when not in use, by screwing a cap onto the inlet of the sewer pipe. However, in practice the cap is often left off, because the threads on the sewer pipe have become dirty or corroded, and the cap will not screw on; or because the cap has been lost.

The present invention solves both of the above-described problems by providing a single device of quite simple form, easily and inexpensively fabricated, which may be readily and quickly used both to securely attach the flexible hose to the inlet of the sewer pipe by means of a pin engaging both the flexible hose and holes in a base permanently attached to the sewer pipe, and may with equal facility also be used to close off the sewer pipe when not in use, by means of a stopper attached to the pin and flexibly but permanently attached to the base.

U.S. Pat. No. 4,133,347 to Mercer discloses a waste evacuation attachment for recreational vehicles, in which a cylinder 16, connected to the sewage outlet 10 of a recreational vehicle by means of an elbow-shaped mounting piece 18, contains an accordion hose 26. The hose 26 has at its outer end a sleeve 34, having pegs 36 for connection to hooks 38 on the outer end of the cylinder 16, and having an end cap 40. Col 2, lines 4–45; FIG. 2. To drain sewage from the recreational vehicle, hose 26 is extended from inside cylinder 16 and sleeve 34 (at the end of hose 26) is connected to a campground waste receptacle 54. Col 3, lines 13–15; FIG. 5. However, the patent, although indicating that sleeve 34 is connected to waste receptacle 54 (col 3, lines 13–15, 53–55; col 4, lines 43–45), is completely silent as to any structure which is used to effect this connection. Such structure is a principal focus of the present invention.

U.S. Pat. No. 4,180,102, Larkin, discloses a sewer connector for recreational vehicles, having a flexible hose 12 connected to the recreational vehicle by a connector 14, having at the outer end of the hose 12 a connector 20 for connection to a sewer ground line. Col 2, lines 12–27; FIG. 1. The only disclosure as to the manner of connecting connector 20 and hose 12 to the ground sewer line is the statement that connector 20 "may be simply an extension or a threaded device for connection to the ground sewer line." Col 2, lines 24–27.

Applicants' invention offers the advantage of not requiring the use of threads in a connection joining the flexible hose to the campground sewer pipe. Because applicants' invention does not require screw engagement of a threaded connection, the connection may be made more quickly with applicants' invention. Also, the use of a threaded connection has the disadvantage, that when one twists the flexible hose through several turns to engage the threaded connection, the twisted hose will apply a counter torque, thus tending to unscrew the connection.

The only other patents found in a pre-filing patentability search ordered by applicants are U.S. Pat. No. 3,323,818, Winchell; U.S. Pat. No. 4,274,455, Simons; and U.S. Pat. No. 3,934,904, Hord. None of these three patents contains disclosures specifically directed to recreational vehicles or to sewage disposal plumbing apparatus.

Winchell discloses a locking telescoping joint in which a cylinder tube 20 slides within a tubular member 10 having a rectangular cross section, which joint has a locking cam in the form of a pin 28 which extends through arcuate slots 24 and 26 in the cylinder 20 and engages the inner surface of the tubular member 10. The pin 28 lies on a diagonal of the square cross section of tubular member 10, when the joint is unlocked, and is free to slide longitudinally in this configuration. Col 2, lines 36–47; FIG. 1. The joint is locked by rotating tubes 10 and 20 with respect to one another, whereupon the arcuate slots 24 and 26 tilt the pin 28, also rotating the pin 28 about the axis of the tube 20, achieving a cam locking effect as the pin 28 is wedged against the sides of the square inner cross section of tube 10. Col 2, lines 48–70; FIGS. 1–2.

Applicants' invention involves a structure which is simpler and easier to operate and fabricate than that of Winchell. In applicants' invention the pin is merely inserted through two holes, not arcuate slots, and no twisting action is required to effect a cam lock wedging effect. In applicants' invention the flexible hose is secured to the base and thus to the sewer pipe by the pin which is simply inserted through the holes in the base, across the space between two folds of the flexible hose.

Winchell also discloses that previously, "slidable adjustable joints have involved interfitting sleeves which are fastened in adjusted position by bolts, set screws, pins fitted into aligned holes and other arrangements which are slow and difficult to operate . . ." Col 1, lines 18–21. Thus Winchell, though referring to the use of pins fitted into aligned holes, does not suggest that such a mechanism could afford part of a mechanism to quickly and easily secure the flexible hose to the campground sewer pipe, as in applicants' invention. If anything, Winchell suggests that such an approach would yield a mechanism which would be slow and difficult to operate.

Simons discloses a toner loading device for manually loading toner into a photocopy machine or computer printout machine. The apparatus has a flexible hose 16 at one end of which is a coupling 24 which may be closed by means of a cap 34, attached to coupling 24 by a chain. Col 3, lines 12–15; 35–37; FIG. 3.

Hord discloses an apparatus for connecting a hose to a drum, in which sleeves 20 and 30 are connected by set screws 36 which engage matching threaded apertures 32 and 34 in the sleeves 30 and 20 respectively. The structure is quite different in form from that of applicants' invention.

The patents known to applicants do not suggest the present invention, described in detail below.

SUMMARY OF THE INVENTION

The present invention is a sewer drain securing device, for use with recreational vehicles, which may be used both to secure a flexible hose, leading from a recreational vehicle sewage holding tank, to a campground sewer pipe; and also to close off the sewer pipe when not in use.

The parts of the invention are a cylindrical base, further described below; a stopper-pin assembly, having a cylindrical stopper with a diameter forming a smooth fit to the inside diameter of the base and a pin securely attached to the stopper, the pin having a handle at one end thereof; and a chain or other flexible connector, flexibly but securely connecting the stopper-pin assembly to the base.

The base is an open cylindrical tube, having an inner diameter forming a smooth fit with the outer diameter of the campground sewer pipe. The base is permanently bonded to the sewer pipe.

About midway up the inner wall of the base is a ridge, formed by a portion of the inner wall of the base having a smaller diameter than the remainder of the inner wall. The ridge acts as a stop means, which supports the stopper when the stopper is inserted into the base. The stopper is inserted into the base and left in place resting upon the ridge, when the operator desires to close off the sewer pipe inlet, between uses.

The upper portion of the base has two holes through the wall of the base, of a diameter which will receive the pin with a smooth fit, lying on a horizontal axis positioned to allow the pin to pass between adjacent corrugations of the outer wall of the flexible hose.

When the operator desires to secure the flexible hose to the sewer pipe, the operator inserts the flexible hose into the top of the base, and, holding the stopper-pin assembly by the handle at one end of the pin, inserts the opposite end of the pin through the two holes in base, moving the flexible hose vertically to allow the pin to pass between two adjacent corrugations on the outer wall of the flexible hose, thus preventing the flexible hose from being removed from the base. To remove the flexible hose the pin is simply retracted from the holes in the base, using the handle, thus allowing the flexible hose to be pulled out of the base.

One of the purposes of the present invention is to provide a simple and inexpensive device, easily fabricated, which may be quickly used to secure the flexible hose to the campground sewer pipe.

Another object of the invention is to provide such a device which may also be used to close off the inlet of the sewer pipe when not in use.

Another object of the invention is to provide a means of accomplishing both of these functions with a single device which is permanently attached to the sewer pipe, so as to avoid loss of any component necessary for accomplishment of either of such functions.

DESCRIPTION OF THE PREFERRED EMBODIMENTS

Figure 1:
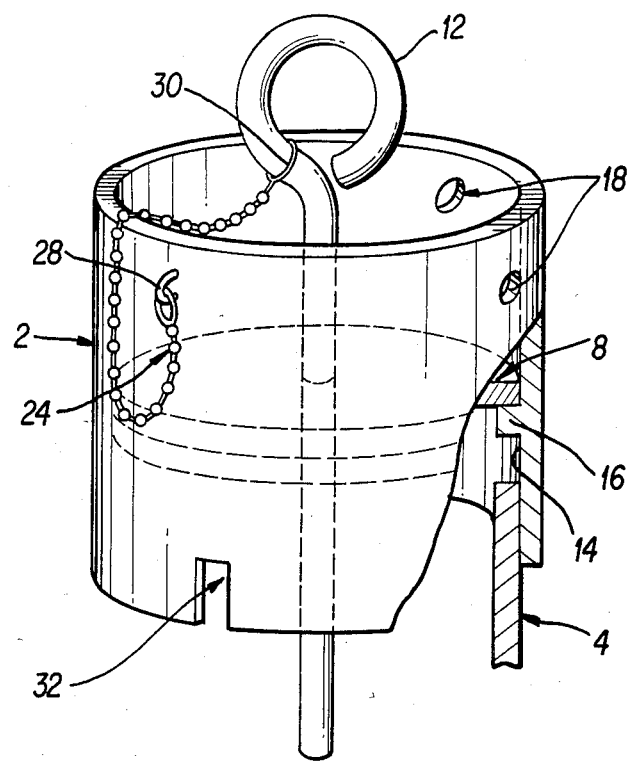
FIG. 1 is a side perspective view of the invention in the position in which the stopper is used to close off the inlet of the sewer pipe, with a portion of the wall of the base cut away to reveal a sectional view, in a plane through the axis of the base, said section showing the stopper resting upon the ridge, and showing a section of the right hand portion of the sewer pipe within the lower portion of the base.
Figure 2:
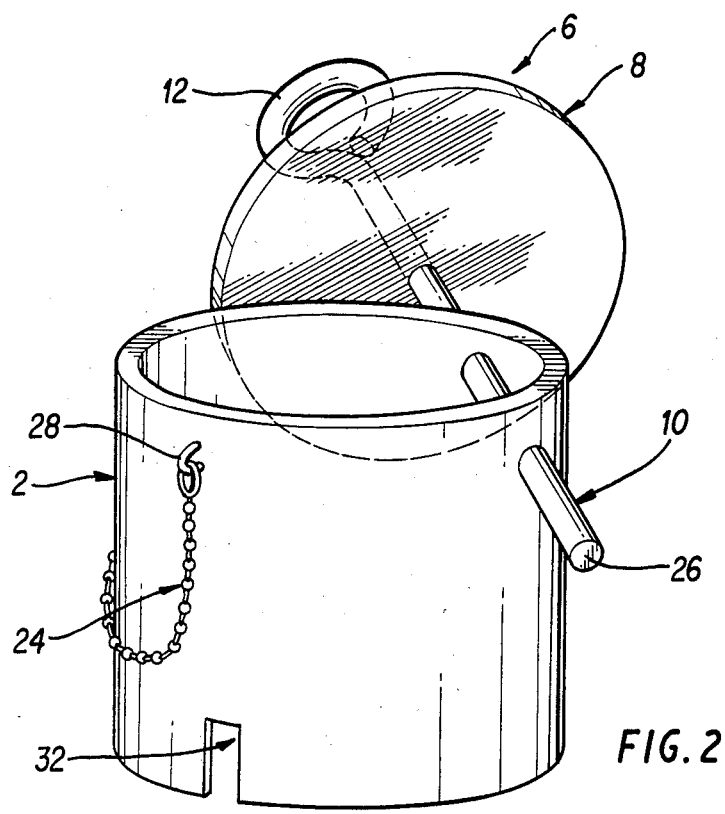
FIG. 2 is a perspective view showing the invention in the position used to secure the flexible hose to the sewer pipe, with the flexible hose and sewer pipe omitted.
Figure 3:
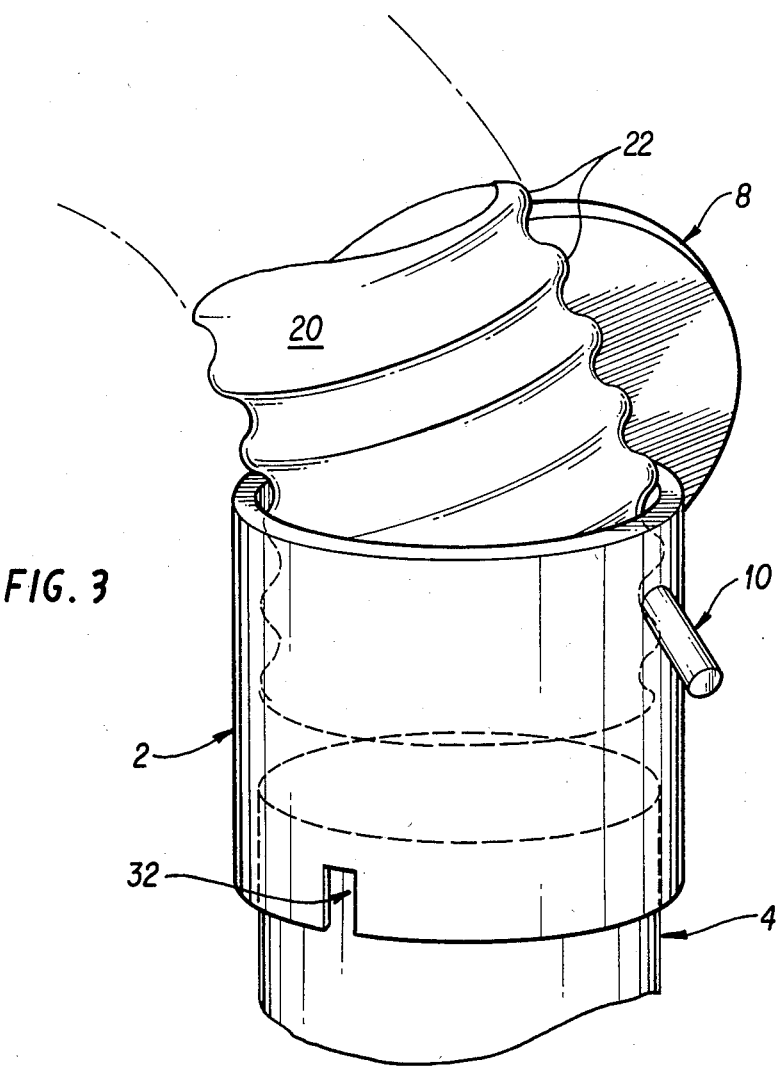
FIG. 3 is a perspective view as in FIG. 2 but with the flexible hose and sewer pipe present, but omitting the connecting chain.
Figure 4:
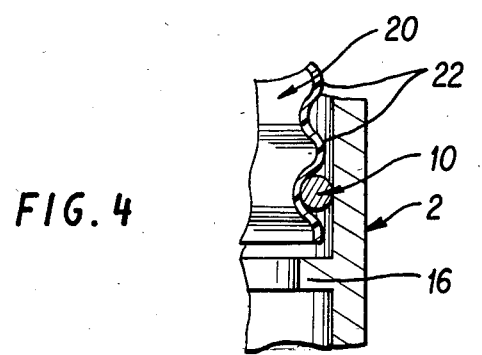
FIG. 4 is a cross section of the right upper portion of the base, on a plane passing through the axis of the base and perpendicularly bisecting the line joining the two holes in the base, showing the pin securing the flexible hose within the base.

Referring now to the drawings, wherein like reference numbers denote like or corresponding parts, the cylindrical base 2 is a short section of cylindrical tubing, having an inner diameter which just exceeds, and forms a smooth fit with, the outer diameter of the campground sewer pipe 4. The majority of campground sewer pipes with which applicants are familiar have an outer diameter of approximately 3½ inches. Base 2 is permanently secured to the sewer pipe 4 by pressing a short portion of base 2 down over the top portion of sewer pipe 4, after applying a suitable permanent glue to each of these pieces. In some campgrounds known to applicants the sewer pipe 4 is larger than that described above, and has an inner diameter of 4 inches. By making the outer diameter of the base 2 just under 4 inches so as to form a smooth fit with the inside diameter of these larger sewer pipes, while the inner diameter just exceeds 3½ inches, the base 2 may be bonded either to the inside of the larger type of sewer pipe 4 or to the outside of the smaller type of sewer pipe 4. FIGS. 1 and 3 illustrate use of the invention with the smaller type of sewer pipe 4. Of course, it is only necessary that base 2 be attached to the inlet of said sewer pipe 4 in a fluid-tight connection. It would be possible to simply bond the bottom of base 2 to the top of sewer pipe 4, even in an embodiment in which the diameters of these pieces did not achieve either of the two kinds of matches described above, if the radii of the base 2 and the sewer pipe 4 are such that there is some overlap of the walls of these pieces.

The stopper-pin assembly 6 has a cylindrical stopper 8 having a diameter just slightly smaller than, and forming a smooth fit with, the inside diameter of the base 2. A pin 10 is securely attached to stopper 8, and lies along the cylindrical axis of stopper 8. One end of stopper-pin assembly 6 has a handle 12 for grasping and moving stopper-pin assembly 6.

About midway up the inside wall 14 of base 2 is a ridge 16, formed by a portion of the inner wall 14 of base 2 having a smaller diameter than the remainder of the inner wall 14. The ridge 16 acts as a stop means, such that when stopper 8 is inserted within base 2, ridge 16 supports stopper 8, and prevents stopper 8 from sliding out of the bottom of base 2.

Near the top of base 2 are two holes 18, each having a diameter just exceeding, and forming a smooth fit with, pin 10. The holes 18 lie upon a chord of a circular cross section of the inside wall 14 of base 2, said chord having a minimum distance $R_{CA}$ from the cylindrical axis of base 2, satisfying the inequality $$R_{MIN} < R_{CA} < R_{MAX},$$

where $R_{MIN}$ and $R_{MAX}$ are, respectively, the minimum and maximum radii of the outer wall of a flexible hose 20 used to convey sewage from a recreational vehicle holding tank to sewer pipe 4, corresponding respectively to the bases and vertices of the corrugations 22 on the outer wall of flexible hose 20.

The stopper-pin assembly 6 and base 2 are flexibly but permanently connected by a light chain 24 securely attached to each.

The method of operation of the invention is described above, in the section summarizing the invention.

The length of the pin 10 on one side of stopper 8 must, of course, exceed the distance between the holes 18 in base 2, so that the pin 10 may be secured to base 2 by insertion through both of holes 18, when it is desired to secure the flexible hose 20 to base 2.

One embodiment of the invention (hereafter "PVC demonstration model") has been fabricated from the following off-the-shelf materials:
(1) one PVC 3-inch connector (for base 2);
(2) one PVC 3-inch plug (for stopper 8);
(3) one ¼-inch by 6-inch machine bolt (for pin 10);
(4) two ¼-inch hex nuts;
(5) one 6-inch section of light chain; and
(6) two AD 44 ABS pop rivets.

Two ¼-inch holes are drilled in the PVC 3-inch connector, as the holes 18, positioned as described above, to form base 2. The PVC 3-inch connector already has, as manufactured, the ridge 16 on the inside wall 14. (In other embodiments the ridge 16 may be formed by machining the inside wall 14 of base 2, in a manner well known in the art). The head of the machine bolt is cut off and the end of the shaft is rounded (e.g., with an emery wheel) at the point of the cut. This end of the bolt forms the end 26 of pin 10 to be inserted in the holes 18 of base 2, which is the end of pin 10 opposite handle 12 of stopper-pin assembly 6. A hole slightly less than ¼-inch diameter is drilled through the center of the top of the PVC 3-inch plug, and said hole is tapped for the ¼-inch bolt. The threaded end of the ¼-inch bolt is fitted with one of the hex nuts, and then screwed through the ¼-inch tapped hole in the top of the PVC 3-inch plug. The second hex nut is then screwed onto the protruding end of the ¼-inch bolt, thus, firmly securing the ¼-inch bolt (the pin 10) to the PVC 3-inch plug (the stopper 8) and thereby forming the stopper-pin assembly 6. The PVC 3-inch plug has, as manufactured, a raised central upper portion of the form of a rectangular solid, which in this embodiment can serve as a handle for grasping the stopper-pin assembly 6. In embodiments of the invention employing a flat stopper 8, as illustrated in the drawings, a suitable handle may be formed by bending the end of pin 10 into a loop, to form the handle 12 of the form indicated in the drawings. Of course the precise form of handle used is only a matter of convenience, and the invention is not to be understood as being limited to any particular form of handle. Indeed, the invention may be employed with no particular handle, if the pin 10 is attached to stopper 8 with an end of pin 10 protruding above the top of stopper 8, in which case the straight upper portion of pin 10 may be used as a handle for grasping the stopper-pin assembly 6.

The six-inch chain is easily attached to form the chain 24 connecting stopper-pin assembly 6 to base 2, by a variety of methods. In the PVC demonstration model, a ⅛-inch hole is drilled in the top of the wall of the PVC connector (base 2) and the chain 24 is secured to base 2 at that point with a pop rivet. Another ⅛-inch hole is drilled in the side of the rectangular top of the PVC plug (stopper 8), and the chain 24 is secured to stopper-pin assembly 6 at this point, using the second pop rivet. Alternatively, as in the embodiment shown in the drawings, the chain 24 could, for example, be permanently attached to base 2 by a metal ring 28 attached to base 2 (which could be soldered or welded to a metal base 2 after being passed through the end loop of chain 24), and attached to handle 12 by being soldered to a metal ring 30 which is of a size forming a tight fit with the portion of pin 10 which forms handle 12. In embodiments in which pin 10 is metal, ring 30 may be soldered to handle 12.

In one embodiment of the invention for use with the smaller 3½ inch outer diameter sewer pipe 4, the base 2 has a narrow vertical slot 32 extending upward from the bottom of base 2. This slot 32 is present because many campgrounds have a cap for sewer pipe 4 which is initially connected by a chain to a screw anchor on the side of sewer pipe 4. This conventional cap is screwed into the opening of sewer pipe 4, which is threaded, when sewer pipe 4 is closed off between uses. The chain often becomes broken because, when the sewer pipe 4 is opened for discharge of sewage from a recreational vehicle, the cap and a portion of the chain are lying upon the ground, where a person often will step upon the cap and thereby break the thin chain, particularly when these operations are carried out in darkness. However, though the chain may be broken and the cap may therefore become lost, the screw anchor on the side of sewer pipe 4 will remain. The slot 32 allows the individual recreational vehicle owner to carry the present invention from one campground to another, and use the invention even where the conventional screw anchor remains. The height of the slot 32 is made to correspond to the position of the screw anchor and the desired height of overlap of the base 2 and the sewer pipe 4 (the distance inside of the base 2 that the sewer pipe 4 intrudes). The distance from the top edge of sewer pipe 4 to the screw anchor, plus the height of the slot 32, must at least equal the desired height of overlap.

The slot 32 will not be necessary, however, in embodiments designed to be installed by the owners of campgrounds, since they may simply remove the conventional screw anchor from the side of sewer pipe 4.

Applicants' invention avoids the problem which often results in the cap becoming lost with the conventional apparatus described above. With the present invention there is no need to ever have any part of the invention lying upon the ground. As shown in FIGS. 1 and 3, the stopper-pin assembly 6 is secured away from the ground both when the sewer pipe 4 is closed off (FIG. 1) and when the invention is being used to secure the flexible hose 20 to the sewer pipe 4 (FIG. 3).

Applicants anticipate that in embodiments of the invention suitable for large scale manufacture, the stopper-pin assembly 6 would be formed from a single piece of metal or plastic, using conventional casting or molding techniques. Such a method could be expected to reduce the cost of large scale manufacturing. It is, of course, apparent from the above description that the operation of applicants' invention is in no way dependent upon whether the stopper-pin assembly 6 is formed from one piece of material or two pieces of material, nor upon the choice of any particular material for formation of the stopper-pin assembly 6, the base 2 or the chain 24. Such components may, of course, be formed from a variety of metals or plastics of suitable strength. Thus, applicants' invention is not to be understood as being limited to the use of any particular materials in the formation of the components thereof.

Those familiar with the art will also appreciate that the specific forms of certain features of the particular embodiments of the invention described above are also not at all crucial to functioning of the invention, and that the invention is not to be understood as limited thereby. Such specific forms of such features include, but are not necessarily limited to the following:

(1) The ridge 16 is only one of numerous equivalent stop means which could be employed to support the stopper 8 within the base 2, and to prevent stopper 8 from sliding out of the bottom of base 2. For example, one could employ an embodiment in which a plurality of small pins project from the inside wall 14 of base 2, and act as an equivalent stop means; or an embodiment in which a thin horizontal diaphragm, containing an opening smaller in diameter than stopper 8, is mounted within base 2. Although the ridge 16 is in the preferred embodiment located essentially midway up the inside wall 14 of base 2, the stop means may as well be located at other elevations within base 2, without affecting the operation of the invention.

(2) Although the pin 10 in the preferred embodiment lies essentially along the cylindrical axis of stopper 8, this configuration is not crucial to the use of the invention. One could instead employ embodiments in which pin 10 is inclined at some angle to the cylindrical axis of stopper 8, provided such angle is not so great as to cause pin 10 to collide with the wall of base 2 when one seeks to insert stopper 8 into base 2. Similarly one could employ embodiments in which pin 10 is connected to stopper 8 at a point other than the center of stopper 8 (whether or not pin 10 is parallel to the cylindrical axis of stopper 8).

(3) Although the preferred embodiments employ a chain 24 as the connecting means to flexibly but permanently connect stopper-pin assembly 6 to base 2, other equivalent means, such as, for example, a flexible wire, may instead by employed.

(4) Although the base 2 is cylindrical in the preferred embodiments, it would be possible to employ a base of similar geometry which is not precisely, but is essentially, cylindrical, e.g. a base having a cross section which is an ellipse having nearly equal major and minor axes, which is thus an essentially circular cross section.

Although the invention has been employed by applicants in the particular context of securing the flexible hose 20 to a campground sewer pipe 4, for the purpose of discharging sewage from recreational vehicles, it will be appreciated that the invention may be employed in quite different contexts, having no relationship to sewage disposal, in which there is a need to quickly secure a flexible hose or tube, having a corrugated outer wall, to the inlet of a pipe, and to seal off the inlet of the pipe when not in use.

Those familiar with the art will appreciate that the invention may be employed in configurations other than those specifically disclosed herein, without departing from the substance of the invention. The essential characteristics of the invention are defined in the following claims.

We claim:

1. Securing device, for securing to the inlet of a pipe a flexible hose having a corrugated outer wall with minimum and maximum radii $R_{MIN}$ and $R_{MAX}$ respectively, comprising:
(a) a base comprising a section of essentially cylindrical tubing of a size which may be securely attached to said inlet of said pipe in a fluid-tight connection, said base further comprising:
   (1) a stop means, attached to the inside wall of said base, for stopping any circular object having a diameter forming an essentially smooth fit with the inside diameter of said base from sliding freely through the entire length of said base;
   (2) two holes through the wall of said base, located essentially upon an axis which is a chord of a circular cross section of the inside wall of said base, where the shortest distance $R_{CA}$ from said chord to the cylindrical axis of said base satisfied the relationship $$R_{MIN} < R_{CA} < R_{MAX}$$

(b) a stopper-pin assembly, comprising:
   (1) an essentially circular stopper, having a diameter forming an essentially smooth fit with the inside wall of said base;
   (2) a pin, connected to said stopper, having a diameter forming an essentially smooth fit with said holes in said base, having a length on at least one side of said stopper exceeding the distance between said holes in said base;
(c) connection means, connected to said base and to said stopper-pin assembly, for flexibly but securely connecting said stopper-pin assembly to said base.

2. The securing device of claim 1, wherein said stopper-pin assembly is formed entirely of one piece of material.

3. The securing device of claim 1, wherein said pin is connected essentially to the center of said stopper.

4. The securing device of claim 1, wherein said pin is essentially parallel to the cylindrical axis of said stopper.

5. The securing device of claim 1, wherein said base has an inner diameter just exceeding, and forming a smooth fit with, the outer diameter of said pipe.

6. The securing device of claim 5, for use with said pipe where said pipe has on the side thereof a screw anchor for a conventional cap chain, wherein said base has a narrow vertical slot extending upward from the bottom of said base, the height of said slot slightly exceeding the desired overlap of said base and said pipe minus the distance from the top of said pipe to said screw anchor.

7. The securing device of claim 1, wherein said base has an outer diameter which is just slightly less than, and forms a smooth fit with, the inner diameter of said pipe.

8. The securing device of claim 1, further comprising a handle attached to said stopper-pin assembly.

9. The securing device of claim 1, wherein said stop means is a ridge on the inside wall of said base, formed by a section of said inside wall having a diameter slightly less than the diameter of the remaining portion of said inside wall of said base.

10. The securing device of claim 1, wherein said stop means is located essentially at the midpoint of the inside wall of said base.

11. The securing device of claim 1, wherein said connection means is a section of light chain attached to said base and to said stopper-pin assembly.

12. The securing device of claim 1, wherein said device is composed of metal.

13. The securing device of claim 1, wherein said device is composed of plastic.

* * * * *